Aug. 6, 1940.    J. DEVINE    2,210,800
MEANS FOR DETERMINING THE MOISTURE CONTENT OF MATERIALS
Filed July 27, 1938    2 Sheets-Sheet 1
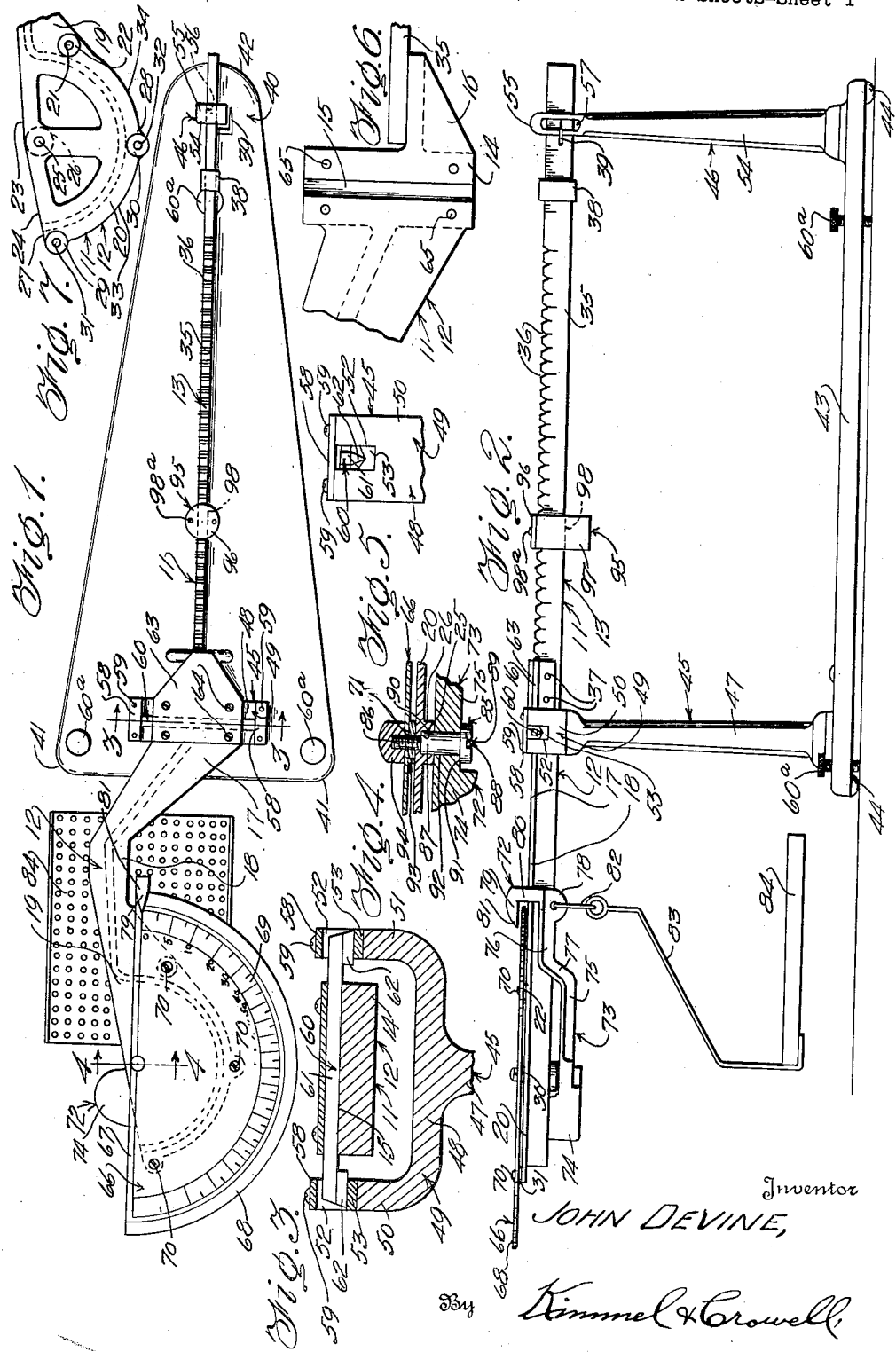
Inventor
JOHN DEVINE,
By Kimmel & Crowell
Attorneys.

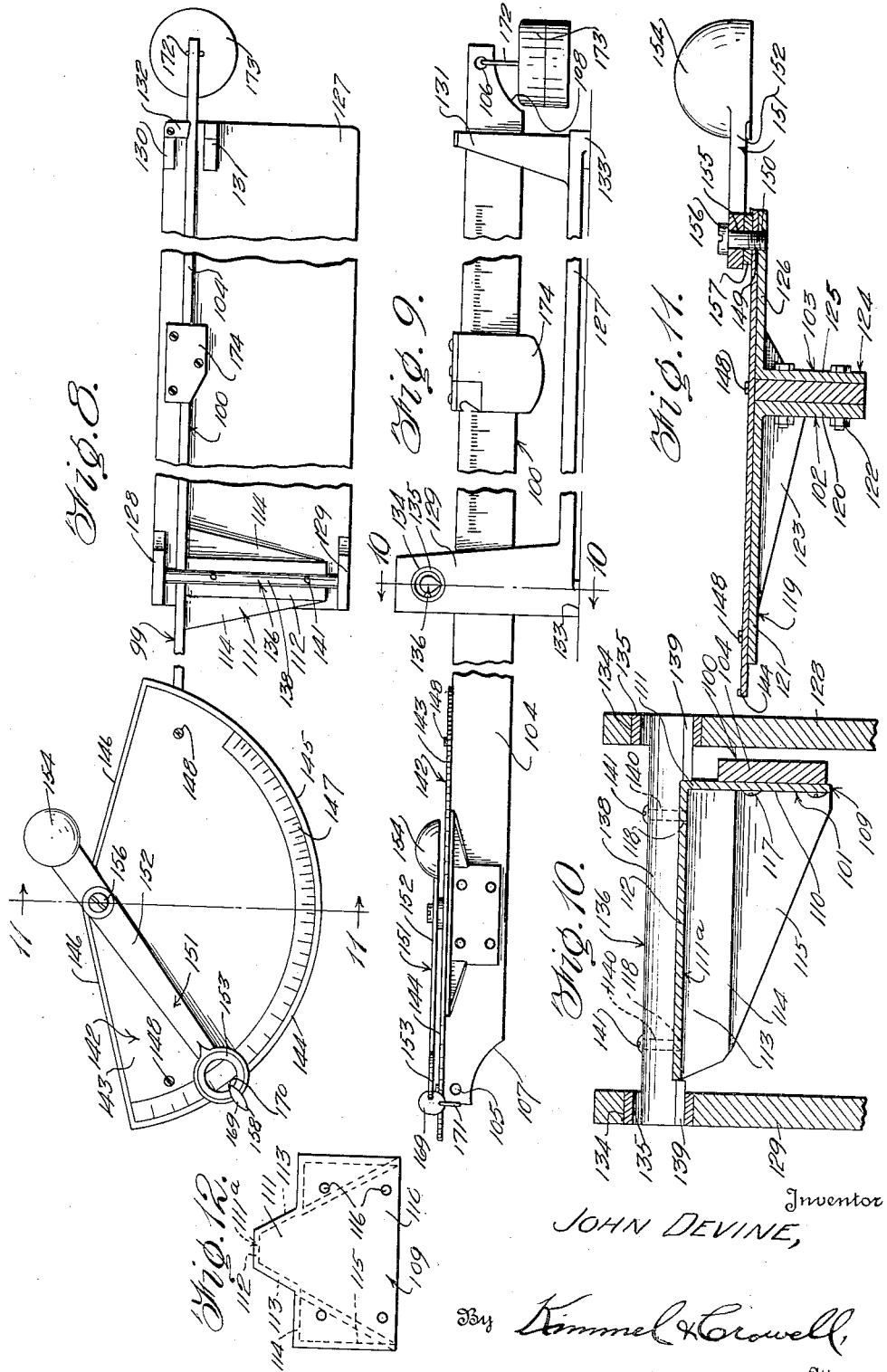

Patented Aug. 6, 1940

2,210,800

UNITED STATES PATENT OFFICE 2,210,800

MEANS FOR DETERMINING THE MOISTURE CONTENT OF MATERIALS

John Devine, Jacksonville, Fla., assignor to Moore Dry Kiln Company, Jacksonville, Fla., a corporation of Florida Application July 27, 1938, Serial No. 221,623

6 Claims. (Cl. 265—35)

This invention relates to a moisture content determining means, and is designed primarily for determining the moisture content of lumber, but it is to be understood that the invention is for use in any connection for which it may be found applicable, by way of example for determining the moisture content of other materials such as sand, coal, cotton, wool, etc., and in the field of chemistry where it is frequently desirable to make a moisture test.

The primary object of the invention is to provide, in a manner as hereinafter set forth, a means for determining the moisture content of a charge of material by direct reading.

A further object of the invention resides in providing a means for the purpose referred to including an indicator element in the form of a lever or arm horizontally revoluble about a fixed pivot, the lever being disposed in a manner whereby the center of gravity thereof permanently lies in the center of the pivot about which it revolves, and with the lever provided with means for connecting therewith a carrier or other support for the material to be tested.

A further object of the invention resides in the providing of the moisture content determining means with the horizontally revoluble lever aforesaid, a plate or carrier, more or less of semicircular contour for correlation with the lever provided on its upper face with a moisture per cent scale, and with the contour of the plate serving the purpose of spreading out the divisions of the scale in the portion where accuracy is most desirable.

A further object of the invention is to provide, in a manner as hereinafter set forth, a means for determining the moisture content of stock in process of being kiln dried and for determining such moisture content by direct reading.

A further object of the invention is to provide, a means of the class referred to for ascertaining the moisture content of lumber in the process of drying it, and the actual moisture content of the lumber after it has been baked out to the point where it ceases to lose moisture.

Further objects of the invention are to provide, in a manner as hereinafter set forth, a means for the purpose referred to which is comparatively simple in its construction and arrangement, strong, durable, compact, readily assembled, thoroughly efficient for the purpose intended thereby, convenient in its use, and comparatively inexpensive to manufacture.

Embodying the objects aforesaid, and to others which may hereinafter appear, the invention consists of the novel construction, combination and arrangement of parts as will be more specifically referred to and illustrated in the accompanying drawings, wherein embodiments of the invention are shown, but it is to be understood that changes, variations and modifications may be resorted to which fall within the scope of the invention as claimed.

In the drawings:

Figure 1 is a top plan view of a moisture content determining means in accordance with this invention, Figure 2 is a side elevation thereof, Figure 3 is a section on line 3—3 of Figure 1 upon an enlarged scale, Figure 4 is a section on line 4—4 Figure 1 upon an enlarged scale, Figure 5 is a fragmentary detail in side elevation upon an enlarged scale, Figure 6 is a fragmentary view in top plan and upon an enlarged scale of a portion of the scale beam, Figure 7 is a fragmentary view in top plan of another portion of the scale beam, Figure 8 is a top plan view, broken away of a modified form of a moisture content determining means in accordance with this invention, Figure 9 is a side elevation, broken away of the structure shown by Figure 7, Figure 10 is a section on line 10—10 Figure 8 upon an enlarged scale, Figure 11 is a section on line 11—11 Figure 7 upon an enlarged scale, and Figure 12 is an elevation looking towards the closed side of the suspension section of the scale beam of the modified form.

With reference to Figures 1 to 7 of the drawings, the form of moisture content determining means illustrated thereby includes a horizontally disposed scale beam 11 formed of a pair of sections 12, 13. The section 12 consists of a single casting having a rectangular part 14 formed in its upper face centrally and lengthwise thereof with a square groove 15 opening at each end of such part, a flat triangular part 16 of angle-shape cross section extending rearwardly from a portion of the inner lengthwise edge of part 14 and having its straight side constituting a bearing for a purpose to be referred to, a forwardly directed outwardly inclined flat part 17 integral at its inner end throughout the front lengthwise edge of the part 14 and gradually decreasing in width from its inner to its outer end, a horizontally disposed part 18 integral at its inner end with the outer end of part 17, a forwardly directed inwardly inclined flared part 19 integral at its inner end with the outer end of part 18 and merging at its outer end into the rear side of a substantially semi-circular skeleton part 20. The part 19 is formed with an opening 21 and an annular boss 22 on its upper part forming a continuation of the opening 21. The part 20 has a pair of inwardly inclined outer side edge portions 23, 24. The edge portion 23 at its outer end merges into the rear end of the edge portion 24. The latter is disposed at a greater inward inclination than the inclination of the edge portion 23. The part 20 in proximity to and aligning with the point of mergence between the edge portions 23, 24 is formed with a pivot hole 25. The part 20 has its lower face formed with a depending boss 26 surrounding hole 25 in spaced relation to the latter. The part 20 is formed with a pair of spaced offsets 27, 28, annular bosses 29, 30 on its upper face which extend onto the offsets, openings 31, 32 extending through part 20 and the bosses 29, 30, a curved edge part 33 leading from offset 27 to offset 28, and a curved edge portion 34 leading from offset 29 to part 19.

The scale beam section 13 is in the form of a bar 35 of rectangular contour in vertical section, disposed on its lower lengthwise edge, and formed transversely of its edge with a row of equidistant spaced notches 36. One side of the bar 35 at its forward end is positioned against the straight side of part 16 of section 12. The forward or front end of bar 35 abuts the rear lengthwise edge of part 14 of section 12. The bar 35 is secured to the part 16 of section 12 by the holdfast means 37. The bar 35 is provided thereon with an adjustable slidably counterweight arranged between the rear end of the row of notches 36 and the rear end of the bar. The latter between the counterweight 38 and its rear end is formed with an angle shape balance indicator 39 on one side thereof. The indicator is disposed laterally on the lengthwise median of such side and is directed rearwardly.

The structure shown by Figures 1 to 7 includes a base 40 gradually decreasing in width from its front to its rear end. The base has rounded front corners 41, a rounded rear end 42, an endless depending edge flange 43, and a pair of aligned front pieces 44 on its longitudinal median. Mounted on the base 40, adjacent the front and rear ends of the latter are standards 45, 46 respectively. The bottoms of the standards are disposed at and on opposite sides of the lengthwise median of the upper face of the base. The standards at their lower ends are fixedly anchored, by any suitable means to base 40. The standard 45 includes a pedestal 47 merging at its upper end into the transverse center of the base 48 of a vertically disposed yoke 49 arranged in transverse relation with respect to the base 40. The arms of yoke 49 are indicated at 50, 51 and are formed with vertical aligned notches 52 opening at their top surfaces centrally of the latter. Arranged within and seated on the bottom walls of the notches 52 are agate bearings 53 of less height than the notches and having V-shaped top edge portions. The standard 46 includes a pedestal 54 merging at its upper end into a beam guide head 55 formed with a passage 56 extending from its front to its rear and an opening 57 disposed at right angles to one side of passage 56 and extending from the latter to the outer surface of one side of the head. The standard 45 includes a pair of removable plates 58 for closing the upper ends of the notches 52. The plates 58 are detachably connected to and on the upper ends of the arms 51, 52 by the removable holdfast means 59. The plates also act as confiners for a fulcrum element 60 to be referred to. The base 40 is provided with spaced adjustable steadying screws 60a.

The part 14 of the section 12 of the scale beam 11 is arranged between the arms 50, 51 of yoke 49. The length of said part 14 is less than the distance between said arms 50, 51. The part 14, when arranged between the arms of yoke 49 is spaced from such arms and is also disposed in superposed spaced relation with respect to the base 48 of yoke 49. The scale beam 11 is shiftably suspended from the standard 45 and for such purpose the fulcrum element 60 coacting with the bearings 53 is employed. The element 60 consists of a horizontally disposed bar 61 of square cross section disposed in lengthwise relation with respect to the part 14 of scale beam section 12 and having spaced endwise aligned knife edge forming portions 62 depending from its lower surface. The ends of bar 61 are oppositely beveled and the outer ends of the portions 62 form beveled continuations of the said ends of the bar. The latter is of greater length than the part 14 of the scale beam section 12, is seated in the groove 15 and extends from the ends of the part 14. The inner ends of the knife edge forming portions 62 are spaced from the ends of said part 14. The end terminal portions of the bar 61 are positioned in the notches or cutouts 52 and the portions 62 are mounted on the bearings 53 which are arranged in the notches 52. Mounted on the part 14 and extending upon the part 15 of the scale beam section 12, as well as extending upon the top of the front portion of scale beam section 13 is a stamping plate 63 for the element 60. The plate 63 is secured to the said part 14 by spaced holdfast means 64 extending therethrough and engaging in sockets 65 formed on the upper face of part 14. The latter when arranged in the yoke 49 is positioned below the top of the latter. The scale beam section 13 extends through passage 56 to rearwardly beyond the head 55. The height of the passage 56 and the groove 57 is greater than the height of scale beam section 13 when the latter is arranged in the position shown in Figures 1 and 2 and which permits such section to cantle or shift relatively to head 55.

The structure as shown by Figures 1 to 7 includes a fixed carrier for an indicating scale. The carrier consists of a semi-circular plate 66 mounted upon and extended from the part 20 of scale beam section 12. The straight marginal portion 67 of the upper face of plate 66 is raised. The curved marginal portion 68 of the upper face of plate 66 is raised. As shown the raised curved marginal portion 68 is of greater width than portion 67. Arranged on that portion of the upper face of plate 66 bordering the marginal portion 68 is a moisture content indicating scale 69. The plate 66 is positioned against the bosses 22, 29 and 30 and fixedly secured to the parts 19, 20 of scale beam section 12 by holdfast means 70 extending through the plate and openings 22, 31, 32. The plate 66 (Figure 4) is formed in close proximity to its straight edge with an opening 71 which aligns with the opening 25 in part 20. The plate 66 bodily moves with the scale beam 11.

The structure shown by Figures 1 to 7 includes a horizontally revoluble indicator element 72 for coacting with the scale 69. Element 72 is arranged below the parts 19, 20 of scale beam section 12 and overlaps the curved edge of the plate 66. The element 72 comprises an arm 73 formed of an enlarged inner end portion 74, an intermediate portion 75 of reduced thickness with respect to the portion 74, an outer end portion 76 substantially of the same contour as portion 75 and disposed at a higher level than the portions 74, 75, an upstanding outwardly inclined coupling portion 77 arranged between, substantially of the same contour as and merging into the portions 75, 76, an apertured depending lug 78 on the outer end of portion 76 and an upstanding angle-shaped pointer 79 integral with the outer end of portion 76. The pointer 79 consists of a vertical leg 80 opposing the curved edge of plate 66 and a horizontally disposed pointed leg 81 which extends inwardly from the upper end of leg 80 to over and beyond the high marginal portion 68 on plate 66.

The structure shown by Figures 1 to 7 includes a hanger 82 carried by the lug 78 and which may be employed for coupling with and for suspending from the indicator element 72 a piece of stock when determining the moisture content of the latter, or it may be employed for coupling with and for suspending from the indicator element 72 a pan for receiving such stock for the purpose referred to. The hanger 82 is shown by way of example as employed for coupling with and suspending from element 72 an angle-shaped depending suspension 83 which carries a pan 84 for receiving the stock.

The element 72 is horizontally revoluble about an upstanding pivot element 85 formed of an upper threaded portion 86, an intermediate plain portion 87 and a lower portion 88 having a groove 89 in its bottom surface. The portion 86 is of less diameter than the portion 87 to provide element 85 with an upper peripheral shoulder 90. The portion 87 is of less diameter than portion 88 to form element 85 with a lower shoulder 91. The portion 75 of arm 73 in proximity to arm portion 74 is formed with a vertical opening 92. The said portion 75 has its upper surface bearing against the boss 26 and with the wall of opening 92 aligning with the inner surface of said boss. Positioned on the part 20 and aligning with the opening 25 in such part, as well as aligning with the opening 71 in plate 66 is a washer 93. The portion 86 of element 85 passes through openings 25, 71 and extends above plate 66. The portion 87 of element 85 extends through opening 92 and into boss 26. The shoulders 90, 91 of element 85 abut respectively the part 20 of scale beam section 12 and the lower surface of the portion 75 of arm 73. Threadedly engaging with the portion 86 of element 85 and bearing against plate 66 is an interiorly threaded cap member 94 which coacts with the portion 88 of element 85 for connecting the latter to plate 66 and scale beam section 12, whereby element 85 will suspend element 72 relative to plate 66 and permit of said element 72 being horizontally revoluble relative to the plate 66, the scale beam and scale 69. The center of gravity of element 72 permanently lies at the center of element 85.

The section 13 of the scale beam 11 has slidably suspended thereon a counterweight 95 formed of an upper section 96 and a lower section 97. The latter is grooved, as at 98 for the passage of beam section 13. The section 96 is detachably connected to the top of section 97 by suitable holdfast means 98a and acts to couple the weight 95 to the scale beam.

With reference to Figures 8 to 12 of the drawings the form of moisture content determining means illustrated thereby includes a horizontal scale beam 99 formed of sections 100, 101, 102 and 103. The scale beam section 100 is in the form of an elongated bar 104 of rectangular contour in vertical section and disposed on its lower lengthwise edge. The bar 104 is formed with a front opening 105 and a rear opening 106. These openings are arranged in close proximity to the end surfaces of the bar. The latter has the forward end terminal portion of its lower lengthwise edge cut-out, as at 107 to form a clearance. The bar 104 has the rear end terminal portion of its lower lengthwise edge cut-out, as at 108 to form a clearance. The scale beam section 101 constitutes a suspension for the section 100 and it consists of a hollow casting open at one side and at its bottom, closed at its other side and closed at its front, rear and top. The casting tapers from its closed side to its open side. The wall which forms the closed side of the casting and which is generally indicated at 109 is formed of a rectangular lower portion 110 and a tapered upper portion 111 centrally of the portion 110. The wall which forms the closed top of the casting and which is generally indicated at 111a includes a rectangular horizontally disposed flat upper portion 112, a pair of oppositely inwardly inclined intermediate portions 113 which merge into the sides of the portion 112 and into the portion 111 of the wall 109, and a pair of oppositely disposed flat inwardly extending lower portions 114 merging into the portions 113 and the top of the portion 110 of the wall 109. The portions 115, only one shown of the casting, which form the front and rear of the latter are of like form, substantially of triangular contour, are oppositely inwardly inclined from the portion 110 or wall 109, merge into the portions 114 of wall 111 and also merge at their larger ends into the sides of the portion 110 of wall 109. The said portion 110 is formed with spaced opening 116. The said portion 110 is positioned against the inner side of section 100 intermediate the ends of the latter. The said portion 110 and section 100 are secured together by the holdfast means 117 passing through the openings 116 and engaging in section 100. The flat upper portion 112 of wall 111 is formed on its lengthwise median with a pair of spaced aligned openings 118 for a purpose to be referred to. The scale beam section 102 consists of an angle-shape bracket 119 formed of a vertical rectangular leg 120 and a skeleton horizontally disposed upper leg 121 substantially of quadrant shape which is integral with and extends outwardly at right angles to the upper end of the leg 120. The latter is secured to one side of the section 100, in proximity to the forward end of the latter by the holdfast means 122. The bracket 119 is formed with integral reinforcing webs 123 for the leg 121. The scale beam section 103 consists of a bracket 124 of materially less area than the bracket 119 and formed of a vertically disposed rectangular leg 125 and a horizontally disposed braced tapered leg 126 having its widest end integral with the upper end of the leg 125. The leg 126 is extended outwardly at right angles to the upper end of leg 125 and is disposed in inner endwise alignment with the inner end of the leg 121 of bracket 119. The leg 125 of the bracket 124 is positioned against the other side of scale beam section 100 and aligns with the leg 120 of bracket 119. The holdfast means 122 also acts to secure bracket 124 to the scale beam section 100. The top surface of the latter is flush with the upper surfaces of the legs 121 and 126.

The structure as shown by Figures 8 to 12 includes a one-piece casting consisting of a rectangular base 127 formed at its front end with a pair of standards 128, 129 arranged in parallel spaced relation and having their outer side faces flush with the lengthwise side edges of the base 127. The latter is also formed with a pair of standards 130, 131 at its rear end. The standard 130 has its outer side face flush with one of the lengthwise edges of the base 127. The standard 131 is arranged in close proximity to the standard 131. The standards 130, 131 have detachably attached to their upper ends a cross-piece 132. The latter constitutes a stop for arresting the upward movement of the rear of the scale beam 99. The standards 130, 131 provide a guide for the scale beam 99. The base 127 is formed with foot pieces 133. The standards 128, 129 near their upper ends are formed with aligned circular openings 134 in which are arranged annular agate bearings 135.

The structure as shown by Figures 8 to 12 includes a fulcrum element 136 for the scale beam 99. The element 136 consists of a bar 138 disposed in transverse relation with respect to and of greater length than scale beam section 101, and a pair of knife edge-forming portions 139 depending from the lower surface of bar 138 and disposed in inner endwise spaced relation. The outer ends of the portions 139 are flush with the ends of bar 138. The latter is seated on the lengthwise center of the top portion 112 of the wall 111 of scale beam section 101, and extends from each end of the said portion 112 into the bearings 135. The bar 138 is formed with spaced openings 140 which align with the openings 118, and it is fixedly secured to the said portion 112 by the holdfast means 141 extending through the aligning openings 118, 140. The knife edge portions 139 extend into and fulcrum on the bearings 135. One of the portions 139 extends over the scale beam section 100 and is of greater length than the other of the said portions 139.

The structure shown by Figures 8 to 12 includes a carrier 142 for an indicating scale. The carrier 142 consists of a horizontally disposed substantially semi-circular plate 143 having its upper face formed with an upstanding endless marginal portion 144. The plate 143 is formed with a semi-circular edge portion 145 and a pair of oppositely disposed inclined edge portions 146 merging into each other at their inner ends and having their outer ends merging into the ends of edge portion 145. The edge portions 146 incline inwardly from their inner to their outer ends. That portion of the upper face of the plate 143 bordering the curved part of the marginal portion 144 is provided with a moisture content indicating scale 147. The plate 143 is mounted on the scale beam sections 100, 102, 103 and fixedly secured to the scale beam sections 102, 103 by the holdfast means 148. The carrier bodily moves with the scale beam 99, and is formed with an opening 149 which aligns with a threaded opening 150 formed in the leg 126 of the beam section 103.

The structure shown by Figures 8 to 12 includes a horizontally revoluble indicator element 151 which coacts with the scale 147. Element 151 is arranged over carrier 142 and consists of an arm 152 formed at one end with an annulus 153 and at its other end with an enlargement 154 constituting a weighting means for the said other end. The arm 152 is pivotally mounted at a point inwardly adjacent to one side of its transverse median and its inner end, and for such purpose arm 152 between its transverse median and the enlargement 154 is formed with an opening 155 through which extends a headed threaded pivot forming member 156. The latter passes through the opening 149 in the carrier and has threaded engagement with the wall of the opening 150 formed in the leg 126 of the beam section 103. A washer 157 is interposed between the arm 152 and the plate 143. The center of gravity of the element 151 permanently lies at the center of member 156. The opening 149 is disposed in close proximity to the point of mergence between the edge portions 146 of plate 143. The annulus 153 rides on the curved part of the marginal portion 144 of plate 143, is disposed over the scale 147 and exposes parts of the latter. The annulus 153 projects beyond the curved edge of plate 143 and is formed on its inner side with a pointer 158 which is integral with the upper surface of the arm 152 at the outer end of the latter. Integral with the outer side of the annulus 153 and extending inwardly and outwardly with respect to such side is an upstanding apertured lug 169. The latter extends above and depends from annulus, aligns with the pointer 158 and has the upper portion of its inner side formed to provide a pointer 170 for coacting with the scale 147.

The structure shown by Figures 8 to 12 includes a hanger 171 carried by the lug 169, and which is employed for coupling with and for suspending from the indicator element 151 a piece of stock for determining the moisture content of the latter.

The openings 105, 106 are to be employed for connecting counterweight hangers to the scale beam section 100 when desired, and as shown by way of example, a hanger 172 is attached to that end of scale beam section 100 provided with the opening 105. Counterweights 173 are mounted on the hanger 172. Slidably mounted on the scale beam section 100 is a sectional counterweight 174.

The term stock is to be understood as being generic to any material with which the means is employed to determine the moisture content thereof.

When a stock receiving pan forms an element of each of the devices, the device may be employed for determining moisture content of a sample by weighing it in its original state and then weighing it again after it has been baked out until it ceases to lose moisture. When it is thus baked to its bone dry condition it can be put back on the pan to obtain a direct reading by adjustment of the indicator lever or arm to give direct reading of its moisture content.

When the stock receiving pan does not form an element of each of the devices, the device may be employed by way of example for determining moisture content of lumber as follows:

It is desirable to have one test-sample-board in each truckload of lumber going into the kiln, particularly if the operation is progressive. When load is being built up, have stackers pick out an above-average "heavy" board, preferably heart stock. Cut out a two-foot piece from close to the middle of the board, or not closer to the end than two feet. Then stack this board, now cut into three pieces in the truckload of lumber, placing it on the outer edge so as to be easily removable.

As soon as possible, cut off a ¼" wafer from each end of the test sample, weigh them, put them in the drying oven and dry to bone-dry, then weigh again and compute the moisture percent. This determined, write the moisture content on the ends of the large test sample. This is highly important, to prevent too rapid drying out through the ends of the sample.

Next, connect the large test sample on the suspension at end of indicator-arm. This indicator-arm oscillates over the moisture content scale. Put the pointer of indicator-arm on the figure representing original moisture content of the large test sample which original moisture content was determined by testing the two small "wafers" cut from each end of the board.

Then move the balance-weight out on the beam until the guide is in balance. Whatever figure the balance-weight stops at, to obtain balance, write this figure down on the large test sample along with the original moisture content. Then put the large test sample back into place in the load.

The next day, remove the test sample and again attach it to the indicator-arm. This time, move the balance-weight back out to the same figure as before. Then move the indicator-arm on the moisture content scale until the beam is balanced and the scale then indicates percentage of moisture in the test sample, and shows the average moisture content of lumber in the entire load.

Each day the test sample can be quickly weighed and actual moisture content determined. This applies to test sample in every load.

Knowing the correct moisture content of lumber in the kiln enables the operator to follow drying schedules closely, step up schedules where indicated with the assurance that it is safe to do so. The means, in accordance with this invention makes it practical for kiln operators to keep accurate records of drying schedules carried from day-to-day on every charge of lumber, also the moisture-loss from the stock day-by-day. The practice tends to make operators more efficient, and insures better and more systematic operation. The operator can literally "keep his finger on the pulse" of the kiln, and the drying rate of the lumber.

A properly-indexed graph-chart makes it easy to keep accurate records, and requires only a few seconds of the operator's time each day.

A drying schedule is based on the species, thickness, moisture content and grade of lumber being dried. It is recommended that stock be segregated so far as possible as to these different characteristics, so that stock of a common drying rate, taking one common schedule, can be all to itself in one kiln. This is not always possible, in which case the schedule must be based on the most difficult or slowest-drying stock in the kiln.

Once the kiln is in operation, the drying schedule maintained should be governed by the moisture content of the stock. Hence, modern drying schedules are based on moisture content. By knowing the exact moisture content of lumber in the kiln, the kiln operator can carry the most effective schedule from standpoint of speed as well as quality. This is where this invention comes to the aid of the operator.

What I claim is:

1. In a means for determining the moisture content of a stock, a scale beam formed of a forward end terminal portion and a rear end terminal portion, said forward terminal portion being off set with respect to said rear terminal portion, said rear terminal portion being provided with weight graduations and an adjustable counterweight, a fulcrum element secured to said forward terminal portion and formed with a pair of spaced aligned knife edges, V-shaped bearing means for said knife edges, a combined stop and guide means for said rear terminal portion, a supporting structure common to said bearing means and said combined stop and guide means, a horizontally disposed substantially semi-circular carrier secured to and extended laterally from said forward end terminal portion, said carrier being formed on its upper face with a moisture content indicating scale, a horizontally disposed revoluble indicator element, means depending from said forward end terminal portion and connected with the carrier for revolubly supporting said indicator element, said indicator element being formed with a pointer at its outer end opposing the upper face of said carrier for coaction with said scale, said indicator element also being formed at its outer end with an opening into which said pointer extends, and means connected to the outer end of the indicator for connecting with the outer end of the indicator element a sample of the stock when determining the moisture content of the said sample.

2. In a means for determining the moisture content of a stock, a scale beam provided with weight graduations and an adjustable counterweight, a fulcrum element secured to said beam intermediate the ends of the beam, bearing means for said element, a combined stop and guide means for the rear terminal portion of said beam, a supporting structure common to said bearing means and said combined stop and guide means, a horizontally disposed carrier positioned on the forward end terminal portion of the beam and extending laterally in opposite directions with respect to the beam, means for securing said carrier to the forward end terminal portion of the beam, a horizontally disposed revoluble indicator element, means connected with said forward end terminal portion and said carrier for revolubly supporting said indicator element, adjacent to one side of the transverse medium of the indicator element, said indicator element being formed with a pointer at its outer end for coaction with the said scale, said indicator element being arranged over said carrier, and extending laterally in opposite directions with respect thereto, and means connected to the outer end of the indicator element for connecting with the outer end of the indicator element a sample of the stock when determining the moisture content of the said sample.

3. In means for determining the moisture content of a stock, a scale beam provided with a fulcrum element, weight graduations and an adjustable counterweight, a horizontally disposed substantially semi-circular flat plate-like carrier fixedly secured at spaced points thereof upon the forward terminal portion of said beam having a curved edge part and being formed on its upper face with a curved moisture content indicating scale spaced from and aligning with said edge part, a horizontally revoluble indicator element, means connected to the carrier and to the said terminal portion of the beam for revolubly supporting the indicator element relative to the carrier, said means being disposed to one side of the transverse median of said indicator element, said indicator element being formed with an inwardly extending pointer at its outer end overlying said face for correlation with said scale, and a suspension on said indicator element for connecting with the carrier and said terminal portion a sample of the stock when determining the moisture content of said sample.

4. In a means for determining the moisture content of a stock, a scale beam provided with weight graduations and an adjustable counterweight, a fulcrum element secured to said beam intermediate the ends of the latter, bearing means for said element, a combined stop and guide means for the rear terminal portion of the beam, a supporting structure common to said bearing means and said combined stop and guide means, a horizontally disposed flat plate-like carrier secured at spaced points thereof to the forward terminal portion of the beam and being formed on its upper face with a moisture content indicating scale, a horizontally disposed revoluble indicator element formed at its outer end respectively with an inwardly extending pointer overlying said face for coaction with said scale and with means for connecting therewith a sample of the stock when determining the moisture content of the sample, means connected to said carrier and the said forward terminal portion of the beam for revolubly supporting said indicator element relative to the carrier, said carrier being substantially of semi-circular contour and having a curved and a non-curved edge part, the said supporting means for the indicator element being disposed to one side of the transverse median of said indicator element and being located on the transverse median of the carrier in proximity to the non-curved edge of the latter, and said scale being curved and aligned with the curved edge part of the carrier.

5. In a means for determining the moisture content of a stock, a scale beam provided with a fulcrum element, weight graduations and an adjustable counterweight, a carrier secured upon the forward terminal portion of said beam and being formed on its upper face with a moisture content indicating scale, a horizontally disposed revoluble indicator element, means connected to the carrier and the forward terminal portion of the beam for revolubly supporting the indicator element relative to the carrier, said means being disposed to one side of the transverse median of said indicator element, said indicator element being formed with a pointer for correlation with said scale, a suspension on the indicator element for connecting with the indicator element a sample of the stock when determining the moisture content of the sample, and a base provided with means to form a bearing for supporting said fulcrum element and a guide for the rear terminal portion of the beam, said indicator element having the major portion thereof arranged below the forward terminal portion of the beam and its remaining portion positioned against the edge of and over the carrier.

6. In a means for determining the moisture content of a stock, a scale beam provided with a fulcrum element, weight graduations and an adjustable counterweight, a carrier secured upon the forward terminal portion of said beam and being formed on its upper face with a moisture content indicating scale, a horizontally disposed revoluble indicator element, means connected to the carrier and the forward terminal portion of the beam for revolubly supporting the indicator element relative to the carrier, said means being disposed to one side of the transverse median of said indicator element, said indicator element being formed with a pointer for correlation with said scale, a suspension on the indicator element for connecting with the indicator element a sample of the stock when determining the moisture content of the sample, and a base provided with means to form a bearing for supporting said fulcrum element and a guide for the rear terminal portion of the beam, said indicator element being disposed over and extending in opposite directions from the carrier.

JOHN DEVINE.